United States Patent [19]

Vodicka et al.

[11] 4,072,508

[45] Feb. 7, 1978

[54] METHOD FOR RECOVERING PALLADIUM FROM SPENT PALLADIUM CATALYSTS

[75] Inventors: Ludek Vodicka; Ivo Peka; Voktor Suchy, all of Praha, Czechoslovakia

[73] Assignee: Vysoka skola chemicko-technologicka, Praha, Czechoslovakia

[21] Appl. No.: 751,791

[22] Filed: Dec. 17, 1976

[30] Foreign Application Priority Data

Dec. 29, 1975 Czechoslovakia .................. 8998/75

[51] Int. Cl.$^2$ ............................................. C22B 11/04
[52] U.S. Cl. ........................................ 75/121; 423/22; 423/489

[58] Field of Search ..................... 75/83, 121; 252/415; 423/22, 489, 240, 464; 208/140; 55/73

[56] References Cited

U.S. PATENT DOCUMENTS 3,958,985  5/1976  Anderson ............................ 75/121
3,969,267  7/1976  McVicker ............................ 252/415

Primary Examiner—M. J. Andrews

[57] ABSTRACT

A technique for recovering palladium from a spent palladium catalyst or ash thereof involves fluorinating the catalyst or ash at elevated temperatures to yield palladium fluoride and decomposing the fluoride with a mineral acid at a temperature ranging from 90° – 100° C.

5 Claims, No Drawings

METHOD FOR RECOVERING PALLADIUM FROM SPENT PALLADIUM CATALYSTS

BACKGROUND OF THE INVENTION

This invention relates to a method for the recovery of palladium. More particularly, the present invention relates to a method for recovering palladium from spent catalysts.

In recent years, the chemical industry has unearthed a wide variety of applications for the noble metal catalysts. Unfortunately, these catalysts are costly and regeneration of spent catalysts is a necessity. Thus, there have arisen for this purpose numerous processes to enhance the effective use of these catalysts. However, regeneration is self-limiting in that a point is reached at which regeneration is no longer effective. Then, workers in the art focus their interest upon recovery of the noble metal, and it is to this end that the subject application is addressed.

Spent palladium catalysts typically comprise palladium in an amount ranging up to 2 percent, the remainder thereof comprising activated carbon, alumina and diverse impurities such as superfine sand, metal soaps and high molecular weight substances. Among the more popular procedures for recovery of palladium from spent catalysts are those which involve incineration of the catalyst in an oven to yield an ash having a palladium concentration ranging from 15 - 25 percent and a small percentage of carbon, frequently in the form of graphite. Unfortunately, the presence of carbon impairs the dissolution of the ash in acids and, consequently, must first be removed. This end is typically attained by annealing the ash at a temperature within the range of 600° - 1000° C. However, some of the carbon remains in the ash so treated, thereby preventing quantitative dissolution of palladium in aqua regia or hydrochloric acid admixed with hydrogen peroxide.

Nonetheless, after stirring the resultant solution, it is permitted to clarify and is then decanted. The sediment is next subjected to repeated dissolution and decantation and the extracts united. The residue is then filtered, washed, dried and treated with sulfuric acid. Thereafter, it is diluted with water, decanted and filtered. The filtrates so obtained are then reduced with zinc to yield raw palladium which is dissolved in an acid to form a concentrated palladium solution which is finally processed in a two-stage process to a palladium sponge. The sponge may then be washed and dissolved to yield a solution which is diluted to approximately 120 gram/-liter palladium. In this manner, about 99 percent palladium is obtained from the ash.

As noted from a review of the conventional process described above, it is a time-consuming operation which places heavy demands upon labor and is objectionable from the standpoint of safety and hygiene. Additionally, the process does not permit the entire palladium content in the spent catalyst to be reclaimed.

SUMMARY OF THE INVENTION

In accordance with the present invention, those prior art limitations are effectively obviated by a novel processing sequence which involves the recovery of palladium from spent catalysts or ashes obtained therefrom by a fluorination process. Briefly, the inventive process involves fluorinating the spent catalyst or ashes thereof with elemental fluorine or a mixture of elemental fluorine with hydrogen fluoride at a temperature which increases gradually from 200° - 500° C, thereby forming palladium fluoride and decomposing carbides and silicates present in the catalyst. Finally, the palladium fluoride is decomposed with a mineral acid at a temperature within the range of 90° - 100° C.

The prime thrust of the instant invention resides in the fact that substantially all of the palladium may be reclaimed from the spent catalyst, but for trace amounts, in a short period of time and in a simplified process as compared with those of the prior art.

In order to more fully appreciate the reaction mechanism, a detailed consideration of the components most often present in palladium ash is required. The ash prepared in the manner described above includes silicon, phosphorous, iron, lead, aluminum, copper, palladium and zinc as well as carbon and trace amounts of arsenic, tungsten, molybdenum, antimony, manganese, magnesium, bismuth, silver and zirconium. These elements are usually present in the form of sintered oxides and carbides. Elementary carbon is first removed and sintered carbide and metal oxides attached by elemental fluorine alone or in combination with hydrogen fluoride. Carbon reacts with fluorine to yield gaseous carbon tetrafluoride or solid carbon fluoride, tricarbon fluoride or carbon trifluoride. Silicon in the form of silicides, oxides and carbides reacts to form gaseous silicon tetrafluoride and phosphorous reacts to form gaseous phosphorous trifluoride or phosphorous pentafluoride. The remaining oxides yield either solid or volatile fluorides. Palladium present as the monoxide forms a non-volatile hygroscopic trifluoride. The only material present in the spent catalyst which is resistant to fluorination is the alumina contained below the surface thereof.

DESCRIPTION OF THE PREFERRED EMBODIMENTS

Examples of the present invention are set forth below. It will be appreciated by those skilled in the art that these examples are for purposes of exposition only and are not to be construed as limiting.

EXAMPLE 1

10 kilograms of ash containing 14.6%, by weight, palladium, obtained by incinerating a spent palladium catalyst at 600° C were placed in pure aluminum oxide beakers and subjected to fluorination in a Monel metal reactor with a mixture comprising 90% fluorine and 10% hydrogen fluoride at a temperature which was gradually elevated from 200° - 500° C.

Volatile fluorides of titanium, lead, antimony, copper, aluminum and trace amounts of palladium were condensed at the reactor outlet. Fluorination was found to reduce the ash weight 37%.

The fluorination product was brown, brittle and porous and darkened after standing in air, such being attributed to hydrolysis of palladium trifluoride due to the release of hydrogen fluoride. The resultant product, containing 12% fluorine, was then hydrolyzed in a polypropylene vessel with hydrochloric acid. The ensuing reaction was exothermic in nature and rapid, the palladium content entering solution with the concurrent release of gases. The solution so obtained was next separated from the insoluble residue by decantation. The insoluble resin was then mixed with hydrochloric acid and the mixture maintained in the polypropylene vessel at a temperature ranging from 95° - 100° C for three hours. The insoluble resin was again separated and the foregoing procedure repeated with hydrochloric acid.

Then, the solid residue was separated in a centrifuge and the resultant solution mixed with those previously removed by decantation. The residue, which was 20%, by weight, of the original ash, comprised aluminum oxide, aluminum fluoride, lead chlorofluoride and graphitic fluorides and about 0.08%, by weight, palladium. 14.52%, by weight, of the total amount of palladium originally contained in the ash was recovered.

EXAMPLE 2

1 kilogram of a spent palladium catalyst (0.5%, by weight, palladium on granulted alumina) was treated with elementary fluorine at 500° C. The carbon present was converted to carbon tetrafluoride or carbon fluoride and the palladium to palladium trifluoride. The catalyst so treated was then extracted in concentrated hydrochloric acid and 0.48%, by weight, of the palladium present entered solution.

What is claimed is:

1. A method for recovering palladium values from spent palladium catalysts and ash thereof which comprises the steps of fluorinating the spent catalyst and ash at a temperature which increases gradually from 200° – 500° C and decomposing palladium fluorides so obtained with a mineral acid at a temperature ranging from 90° – 100° C to obtain palladium values in solution.

2. Method in accordance with claim 1, wherein fluorination is effected with elemental fluorine.

3. Method in accordance with claim 1, wherein fluorination is effected with a mixture of fluorine and hydrogen fluoride.

4. Method in accordance with claim 1, wherein the mineral acid is hydrochloric acid.

5. Method in accordance with claim 3, wherein the mineral acid is hydrochloric acid.